Patented Dec. 27, 1938

2,141,383

UNITED STATES PATENT OFFICE 2,141,383

PROCESS OF PREPARING SOLUTIONS OF CELLULOSE IN SULPHURIC ACID

Heinrich Fink and Richard Hofstadt, Wolfen (Kreis Bitterfeld), Germany, assignors to I. G. Farbenindustrie Aktiengesellschaft, Frankfort-on-the-Main, Germany No Drawing. Application June 19, 1937, Serial No. 149,210. In Germany July 21, 1936

4 Claims. (Cl. 260—100)

Our present invention relates to the preparation of solutions of cellulose in sulphuric acid suitable for the production of threads, ribbons, bristles, films and the like therefrom.

The action of strong sulphuric acid on cellulose is apt to produce substances of the sugar group and other degradation products of the cellulose so that the prepartion of a solution of cellulose in sulphuric acid, suitable for making threads and other structures, necessitates special precautions for avoiding as far as possible this degradation of the cellulose.

Two modes of operating have been described in particular for making suitable cellulose solutions in sulphuric acid. The first consists in treating the cellulose with sulphuric acid of such concentration that no alteration of structural fiber of the cellulose occurs and then adding sulphuric acid of sufficient strength to dissolve the cellulose and finally diluting the solution of cellulose with a weaker sulphuric acid. The second process consists in dissolving the cellulose directly in strong sulphuric acid, for example sulphuric acid of over 60 per cent strength, and then as in the first process diluting the solution with a weaker sulphuric acid or with water until the content of acid is below 60 per cent. In some cases the solutions of cellulose in sulphuric acid of over 60 percent strength have been worked up directly without dilution to a strength below the limit of the solubility. In all these processes the cellulose has been used in a dry or air-dry condition.

It is an object of the present invention to provide solutions of cellulose in sulphuric acid which yield artificial threads having a substantially increased copper viscosity and textile strength.

A further object is to provide a process by which solutions of this kind may be obtained from wet or moist pulp, especially in the form of a wet pulp such as is obtained in the disintegration of wood and the necessary purification and bleaching processes in making paper pulp. Such wet cellulose may contain, for example, 50 per cent of water. In it the fibers of cellulose are from the first well separated so that in making a solution there is no union of the fibers. Thus the cellulose may be distributed in the sulphuric acid in an essentially shorter time and at a lower concentration of acid than has hitherto been possible.

In the process of the invention the wet cellulose is uniformly distributed in several times its weight of dilute sulphuric acid, the concentration of which is such that the liquid consists of an acid containing 52 to 57 per cent of H$_2$SO$_4$; preferably the distribution is conducted at a low temperature. It is advantageous to stir the cellulose pulp in cooled or frozen condition into the sulphuric acid. So much strong sulphuric acid is added to the mixture while cooling that the cellulose dissolves. This solution of cellulose then contains, without allowing for the dissolved cellulose, a concentration of about 62 to 63 per cent of sulphuric acid.

It has been discovered that the copper viscosity of threads prepared from solutions according to the present invention is higher than of those prepared from solutions of dry wood pulp.

Two comparative examples may serve to illustrate this feature of the invention.

*Example 1.*—224 parts of cellulose dried as usual (air dry containing 5 per cent of moisture) are distributed in 3490 parts of sulphuric acid containing 59 per cent of H$_2$SO$_4$ at 0° C. The concentration of the mixture decreases to 58.8 per cent of H$_2$SO$_4$ owing to the small quantities of water in the cellulose and the temperature rises to +4° C. The mixture is dissolved in a kneading machine while continuously stirring and cooling at 0° C. By addition of 728 parts of sulphuric acid of 86 per cent H$_2$SO$_4$ which has been previously cooled down to −2° C. the concentration of sulphuric acid of this solution amounts to 63.5 per cent of H$_2$SO$_4$, the cellulose content to 4.8 per cent. This solution is brought into a small pressure vessel and is spun therefrom after 45 minutes. By pressing into water and using the usual spinning jets the copper viscosity of the threads thus obtained is determined in the usual manner after purifying and drying. The copper viscosity is found to amount to 61.2.

*Example 2.*—473 parts of wet cellulose (224 parts of dry cellulose) are distributed in 2910 parts of sulphuric acid of 59 per cent H$_2$SO$_4$ at 0° C. The concentration of the mixture decreases to 54.16 per cent H$_2$SO$_4$ owing to the water content of the cellulose and the temperature rises to +5° C. The mixture is dissolved in the same manner as described in Example 1 by addition of 1083 parts of sulphuric acid containing 86 per cent H$_2$SO$_4$. The final concentration of the solution is 62.3 per cent H$_2$SO$_4$ and 4.8 per cent cellulose. The solution is worked into threads as indicated in Example 1. The copper viscosity of these threads amounts to 117.4, approximately double of the voscosity obtained according to Example 1.

With an increase of the copper viscosity of the fibers there is connected an increase of the tensile strength.

It is within the scope of the present invention to prepare the solutions at a slightly higher temperature than that indicated in the examples. Less viscous solutions which may be easily mixed are obtained and the threads therefrom still possess superior physical qualities.

The following examples serve to further illustrate the invention, the parts being by weight.

3. 490 parts of a mass consisting of 50 per cent of cellulose and 50 per cent of water, is mixed with 3000 parts of a sulphuric acid of 58 per cent strength at 15° C., whereby there is obtained a suspension of cellulose in sulphuric acid of 53 to 54 per cent strength. To this suspension there are added at —3° C. 1650 parts of sulphuric acid of 80 per cent strength so that the cellulose is dissolved in a solution containing 62.5 per cent of sulphuric acid. This solution can be immediately spun.

4. 490 parts of a mass consisting of 50 per cent of cellulose and 50 per cent of water, is mixed with 3000 parts of a sulphuric acid of 58 per cent strength at 10° C., whereby a suspension of cellulose in sulphuric acid of 53 to 54 per cent strength is obtained. To this mass are added at —3° C. 1650 parts of sulphuric acid of 80 percent strength. There is produced a solution of cellulose in sulphuric acid of 62.5 per cent strength which is diluted by addition of 1360 parts of sulphuric acid of 45 per cent strength.

5. 590 parts of a mass consisting of 41 per cent of cellulose and 59 per cent of water is mixed with 2880 parts of a sulphuric acid of 63.2 per cent strength at 5° C., whereby a suspension of cellulose in sulphuric acid of 56.4 per cent strength is produced. To this mass there are added at —3° C. 1195 parts of sulphuric acid of 80 per cent strength, whereby a solution of cellulose in sulphuric acid of 62.8 per cent strength is obtained. This solution may be spun immediately or alternatively after dilution with 1345 grams of sulphuric acid of 45 per cent strength at —1° C.

Naturally the water content of the cellulose must exceed a certain value—which may easily be determined by anyone skilled in the art—to have the effect according to the present invention. On the other hand the water content is only limited from a practical point of view by the progressing dilution of the acid solution, as the water content increases. Roughly speaking cellulose with a water content from about 20 to 70 per cent may be advantageously employed.

In the claims following hereafter the percentages of sulphuric acid are calculated without allowing for the dissolved cellulose.

What we claim is:

1. A process of preparing a solution of cellulose, which comprises mixing cellulose wet with water with sulphuric acid, said sulphuric acid having a concentration so as to yield a liquid containing 52 to 57 per cent of $H_2SO_4$, and adding to said liquid so much strong sulphuric acid that the final concentration of the mixture is from 62 to 63 per cent $H_2SO_4$.

2. A process of preparing a solution of cellulose, which comprises mixing cellulose wet with water with sulphuric acid at a temperature of from 0 to 15° C., said sulphuric acid having a concentration so as to yield a liquid containing 52 to 57 per cent of $H_2SO_4$, cooling said liquid to about —3° C. and adding so much strong sulphuric acid that the final concentration of the mixture is from 62 to 63 per cent $H_2SO_4$.

3. A process of preparing a solution of cellulose, which comprises mixing wet cellulose consisting of 50 per cent of cellulose and 50 per cent of water with sulphuric acid, said sulphuric acid having a concentration of 58 per cent at 15° C. so as to obtain a suspension of cellulose in sulphuric acid of 53 to 54 per cent, adding thereto sulphuric acid of 80 per cent strength at a temperature of about —3° C. so that the final concentration of the liquid amounts to 62.5 per cent $H_2SO_4$.

4. A process of preparing a solution of cellulose, which comprises mixing a mass containing 50 per cent cellulose and 50 per cent of water with sulphuric acid of 58 per cent strength at 10° C., thus obtaining a suspension of cellulose in sulphuric acid of 53 to 54 per cent, adding thereto sulphuric acid of 80 per cent strength at about —3° C. so that a solution of cellulose and sulphuric acid of 62.5 per cent is obtained, and diluting said solution by addition of sulphuric acid of 45 per cent strength..

HEINRICH FINK.
RICHARD HOFSTADT.